Dec. 21, 1948.  C. C. S. LE CLAIR  2,457,051
METHOD OF MAKING REINFORCED POROUS METAL MEMBERS
Filed May 25, 1945  2 Sheets-Sheet 1

Inventor
Camille Clare Sprankling Le Clair
By
Williams, Bradbury & Hinkle
Attorneys Dec. 21, 1948.  C. C. S. LE CLAIR  2,457,051
METHOD OF MAKING REINFORCED POROUS METAL MEMBERS
Filed May 25, 1945  2 Sheets-Sheet 2
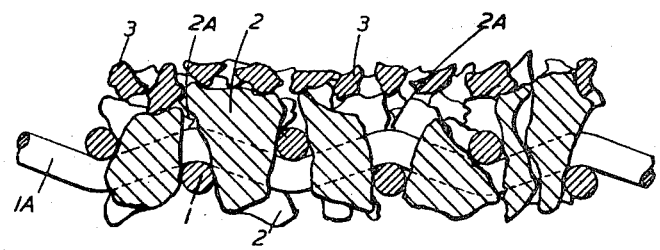
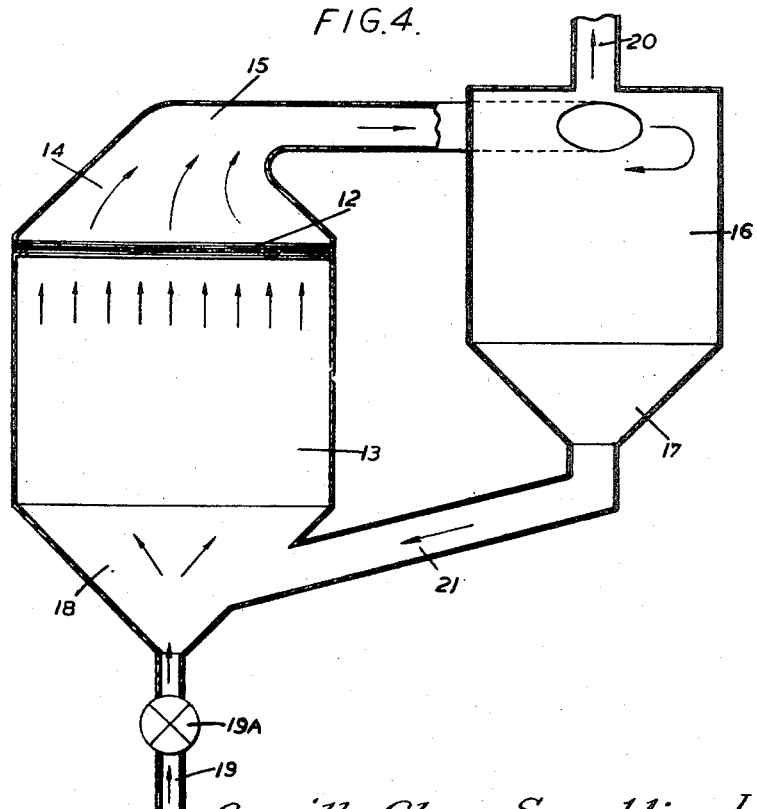
Inventor
Camille Clare Sprankling Le Clair
By
Williams, Bradbury & Hinkle
Attorneys.

Patented Dec. 21, 1948

2,457,051

UNITED STATES PATENT OFFICE 2,457,051

METHOD OF MAKING REINFORCED POROUS METAL MEMBERS

Camille Clare Sprankling Le Clair, Acton, London, England, assignor to Tecalemit Limited, Brentford, England, a corporation of Great Britain Application May 25, 1945, Serial No. 595,714
In Great Britain August 18, 1944

4 Claims. (Cl. 29—148)

This invention relates to method of making porous metal or alloy members which, although particularly adapted for use in filtering fluids, are also adapted to be used for many other purposes. For simplicity, however, the invention will be described with reference to its application to filtering media.

Filtering elements consisting of porous members prepared by sintering metallic particles have previously been used for the filtering of fluids. The filtering action is confined to the surface of such a member or, at any rate, to the outer layers of granules to a depth of several particle diameters or thicknesses. Any further mass of granular material under the outer layers serves no useful purpose other than providing mechanical support for the outer layers, and a restriction to the flow of the fluid which, in the case of a filter, is a distinct disadvantage.

Even if the porous metal member could be produced in a very thin section, it would be too weak and relatively too brittle to be capable of supporting the pressure loading normally applied to such filtering element.

The object of the present invention, therefore, is to provide a porous metal or alloy member, such as a filtering medium, in which the closest possible approach is made to a single layer of granular material, whilst obtaining mechanical strength.

According to the present invention, a filtering medium comprises a base or support consisting of wire gauze or mesh, or perforated metal or alloy sheet or equivalent, in the interstices of which are deposited metal or alloy particles which are subsequently sintered so that they adhere to the base or support.

If extremely fine filtration is required, it may be necessary to load the base or support with particles too fine to be caught in the interstices of wire gauze or mesh which is strong enough to act as a base or support or in the holes of any practicable perforated metal or alloy. In order to overcome this difficulty, the base or support may first be loaded with large particles of sufficient size to be securely caught and then to deposit on top of these a second layer of finer particles which will be securely caught by the particles of the first layer and subsequently sintered.

It may even be necessary to add a third or more layers of particles of progressive fineness, each layer being so graded that its particles are caught upon those of the layer beneath.

Such a construction permits the liquid passing between the finer particles in the upper layers to flow laterally between the coarser particles of the lower layers to the nearest apertures in the wire gauze, or mesh, or sheet or equivalent.

Since the wires of the gauze or mesh or the metal of the perforated sheet occupy a substantial proportion of the total area, this freedom of lateral flow to the nearest apertures represents a considerable advantage in reducing the resistance to flow of the whole element.

It is preferred that the base or support and the particles should be of the same metal or alloy.

A simple method of constructing a filtering medium according to this invention consists in arranging a wire gauze or mesh or perforated metal or alloy base in a stream of fluid in which particles of a metal or alloy are suspended. This method of loading the gauze or mesh or perforated metal or alloy base not only selects the particles but also provides the closest approach to completely even distribution of the particles. The selection follows because if a particle is of the wrong shape or size properly to fill a given aperture in the wire gauze or mesh or perforated metal or alloy base, it will either pass through the aperture or fall away from the gauze or mesh or perforated metal or alloy base when the latter is removed out of the said particle-laden fluid.

The even distribution follows because the particle-laden fluid naturally flows through the gauze or mesh or perforated metal or alloy base where the resistance is least. As the apertures in any one area become obstructed by particles, the resistance increases, and the fluid automatically flows elsewhere to other areas where the resistance is less. This feature greatly increases the statistical probability of all apertures being uniformly loaded.

The accompanying drawings show, by way of example, two filtering media constructed in accordance with this invention and, diagrammatically, two methods of applying the metal or alloy particles to the base or support.

Fig. 2 is a sectional view, also to a greatly enlarged scale, of a portion of a filtering medium which comprises a wire gauze or mesh having a coating or layer of relatively coarse particles and a second layer of finer particles;

Fig. 4 shows a method of loading a base or support by means of air or gas borne particles.

Figure 1:
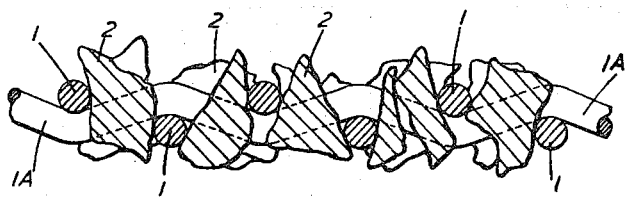
Fig. 1 is a sectional view, to a greatly enlarged scale, of a portion of a filtering medium which comprises a wire gauze or mesh having a single coating or layer of metal or alloy particles.

Referring first to Fig. 1, a gauze or mesh member of metallic wire is loaded with metal or alloy particles 2 in the interstices between its warp and weft wires 1 and 1A in the manner briefly described above. The loaded member is then placed in a furnace and the whole is raised to such a temperature that sintering takes place, whereby the particles 2 are attached at their points of contact to the metallic wire of the gauze or mesh member.

A substantially large proportion of the area of the loaded gauze or mesh member is represented by the wire of the gauze or mesh and the total number of apertures per unit area is restricted. Referring to Fig. 2, which illustrates the multiple layer construction, a second coat or layer of finer metal or alloy particles 3 is applied on top of the coarse particles 2, the interstices 2A between which in the space between the surface of the gauze or mesh and the underside of the fine layer provide a means for liquid passing through the fine layer to flow laterally to the nearest aperture in the wire gauze or mesh member.

Reference has been made above to a method of constructing a filtering medium according to this invention by arranging a wire gauze or mesh member in a stream of the fluid in which particles of a metal or alloy are suspended. The fluid used may, for example, be gaseous or liquid, and if the latter may be aqueous or otherwise, such as carbon tetrachloride, for example. The methods used will vary but, as examples only, reference will now be made to two methods.

Figure 3:
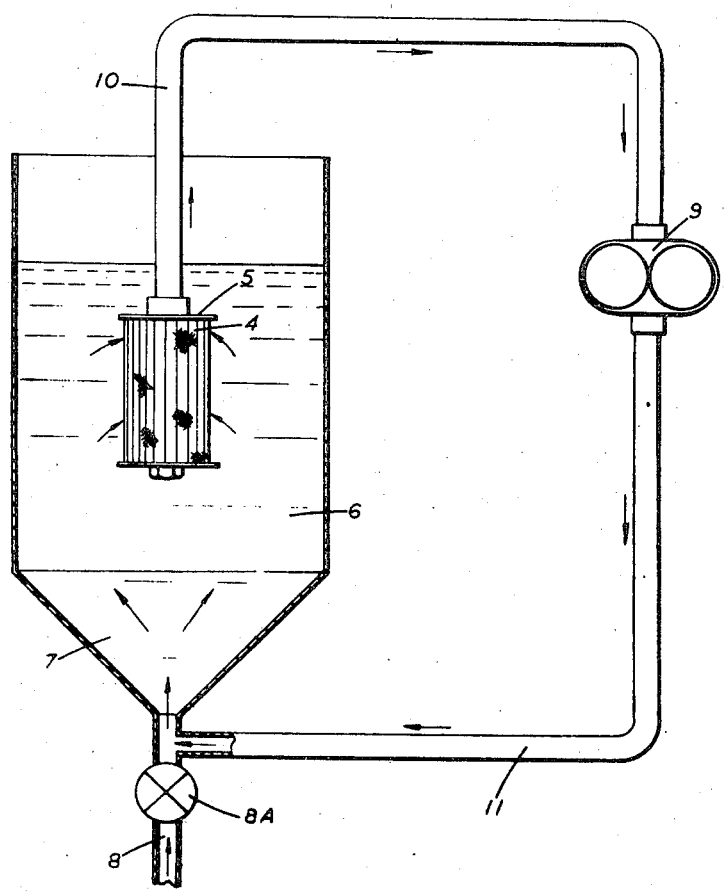
Fig. 3 shows a method of loading a base or support by means of liquid-borne particles.

Referring to Fig. 3, which illustrates one of these methods, a wire gauze or mesh base or support 4, which in this case is shown as being preformed to the shape of the filter element required, is mounted upon a rigid framework 5 which is arranged within a part-cylindrical container 6 having a conical bottom part 7. The metal or alloy particles are suspended in the liquid in the container and the liquid is circulated through the preformed base or support 4 by means of a pump 9 whose suction side is connected by the pipe 10 to the space within the rigid framework 5 and whose delivery pipe is connected to the base of the conical part of the container. In this way, a stream of particle-laden liquid is drawn through the gauze or mesh and loads it uniformly as previously described.

As an additional means of ensuring the quick and even deposit of particles upon the gauze or mesh, the liquid in the container 6 may be kept in a state of agitation by means of compressed air introduced from the pipe 8, through a control valve 8A.

Referring to Fig. 4, which illustrates the other method referred to above, the apparatus is similar but, in this case, the particles are carried in an air stream provided from a source of compressed air. The base or support 12 is shown as being flat and is arranged at the top of the container 13 below a hood 14 having an outlet conduit 15 which projects into, and communicates with, the interior of a pneumatic vortex separator 16. The bottom part 17 of the separator, is connected to the conical bottom part 18 of the container, to which latter compressed air is fed through a conduit 19 controlled by a valve 19A. In this apparatus, the metal or alloy particles are propelled upwards in the container 13 towards the wire gauze or mesh support or base 12 by a stream of compressed air which enters the bottom of the container. Air and such metal or alloy particles as pass through the wire gauze or mesh enter the vortex separator 16, the air being exhausted from the top of the latter through a conduit 20 and separated particles being returned to the bottom of the container 13 via the conduit 21.

It will be understood that the liquid-borne method shown in Fig. 3, is also applicable to the loading of a flat base or support and that the airborne method shown in Fig. 4, is also applicable to the loading of a preformed base or support.

I claim:

1. The method of constructing a porous member having a support consisting of a perforated member or the like, comprising the steps of suspending metal or metal alloy particles in a flowing stream of fluid, at least a portion of said particles being of such size as not readily to pass through the interstices of the support causing said stream to flow under pressure, positioning the support in the path of said stream flowing under pressure so that at least a portion of the particles suspended in said stream become evenly distributed in and firmly wedged into the interstices of the support, and finally sintering the particles so that they adhere to the support.

2. The method of constructing a porous member having a support consisting of a perforated member or the like, comprising the steps of positioning the support in a container, causing a stream of fluid under pressure in which metal or metal alloy particles are suspended to flow through the container and through the support so that at least a portion of the particles become evenly distributed in and firmly wedged into the interstices of the support under the action of the fluid flowing under pressure, and finally sintering the particles so that they adhere to the support.

3. The method of constructing a porous member having a support consisting of a perforated member or the like, comprising the steps of suspending metal or metal alloy particles in a flowing stream of fluid, at least a portion of said particles being of such size as not readily to pass through the interstices of the support causing said stream to flow under pressure, positioning the support in the path of said stream flowing under pressure so that at least a portion of the particles suspended in said stream become evenly distributed in and firmly wedged into the interstices of the support, depositing a layer of particles sufficiently small to pass through the perforated member over the member and the particles wedged therein, and finally sintering the particles so that they adhere to each other and to the support.

4. The method of constructing a porous member having a support consisting of a perforated member or the like, comprising the steps of suspending metal or metal alloy particles in a flowing stream of liquid causing said stream to flow under pressure, positioning the support in the path of said stream flowing under pressure so that at least a portion of the particles suspended in said stream become evenly distributed in and firmly wedged into the interstices of the support, and finally sintering the particles so that they adhere to the support.

CAMILLE CLARE SPRANKLING LE CLAIR.

REFERENCES CITED

The following references are of record in the file of this patent:

UNITED STATES PATENTS

| Number | Name | Date |
|---|---|---|
| 529,990 | Wyckoff | Nov. 27, 1894 |
| 1,579,171 | Zoul | Mar. 30, 1926 |
| 2,267,918 | Hildabolt | Dec. 30, 1941 |
| 2,300,048 | Koehring | Oct. 27, 1942 |
| 2,364,713 | Hensel | Dec. 12, 1944 |
| 2,372,607 | Schwartzkopf | Mar. 27, 1945 |
| 2,409,295 | Marvin et al. | Oct. 15, 1946 |